United States Patent [19]
Leiber

[11] Patent Number: 4,550,954
[45] Date of Patent: Nov. 5, 1985

[54] HYDRAULIC VEHICLE BRAKE SYSTEM

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 526,237

[22] Filed: Aug. 25, 1983

[30] Foreign Application Priority Data

Nov. 20, 1982 [DE] Fed. Rep. of Germany ....... 3243019

[51] Int. Cl.$^4$ .............................................. B60T 17/18
[52] U.S. Cl. ..................................................... 303/92
[58] Field of Search ................. 303/92, 93, 95–100, 303/110, 111; 364/426

[56] References Cited

U.S. PATENT DOCUMENTS 4,462,642 7/1984 Leiber .............................. 303/92 X
4,478,461 10/1984 Leiber ................................. 303/92

Primary Examiner—Duane A. Reger
Attorney, Agent, or Firm—Edwin E. Greigg

[57] ABSTRACT

A hydraulic vehicle brake system is provided, which includes at least one static brake circuit and at least one anti-skid regulator, in which in the event of regulation the pressure of an external power supply is connected via a feed valve to the brake circuit and in which the discharged pressure medium is returned to the supply container. In order to prevent the pressure medium in the static circuit from being used up in the event of failure of the feed valve, the switchover of the feed valve is monitored, and the regulation of the brake pressure is either allowed to occur or is prevented in accordance with this switchover.

15 Claims, 2 Drawing Figures

HYDRAULIC VEHICLE BRAKE SYSTEM

BACKGROUND OF THE INVENTION

The invention relates to a hydraulic vehicle brake system as generally defined hereinafter.

In brake systems in which the braking pressure is regulated upon a tendency toward wheel lock or skidding, and in which at least one main brake cylinder (that is, at least one static brake circuit) is used, it is known, in addition to applying the principle of recirculating the discharged pressure medium in the event of a pressure drop, to deliver the pressure medium directly to a pressure-free supply container, and it is also known to connect an external energy supply system, comprising a pump and pressure reservoir, to the brake pressure control valves in order to avoid running out of pressure medium in the static brake circuit during regulation. In brake systems known from German laid-open applications DE-OS 1 655 448 or (U.S. Pat. No. 3,706,479) or DE-OS 3 040 548 (British Pat. No. 2,086,506) this supply system is connected during regulation with the pressure regulating valves instead of the main brake cylinder, while in other known systems such as that of DE-OS 3 040 561(British Pat. No. 2,086,509), the pressure of the supply system is fed into the main brake cylinders during regulation. It is thereby possible for the [external] supply system to be provided only for feeding pressure during regulation; however, this supply system is preferably used in addition to an amplification of braking force.

OBJECT AND SUMMARY OF THE INVENTION

It is the object of the present invention to improve brake systems of the general type discussed above such that even if there is some malfunction in the valve assembly which turns the external supply system on, it is assured that the brake fluid will not be used up.

Also, it is known from German laid-open application DE-OS 3 040 540 that a blocking valve can be provided which is mechanically released following a predetermined deflection of a positioning piston and thereby closes the return-flow line, thus preventing the main brake cylinder piston from dropping all the way. This provision is expensive, however, and there still exists a need to insure against the unnecessary loss of brake fluid without incurring the addition of auxilliary parts and extra expense.

The invention will be better understood and further objects and advantages thereof will become more apparent from the ensuing detailed description of a preferred embodiment taken in conjunction with the drawings.

DESCRIPTION OF THE PREFERRED EMBODIMENTS

Figure 1:
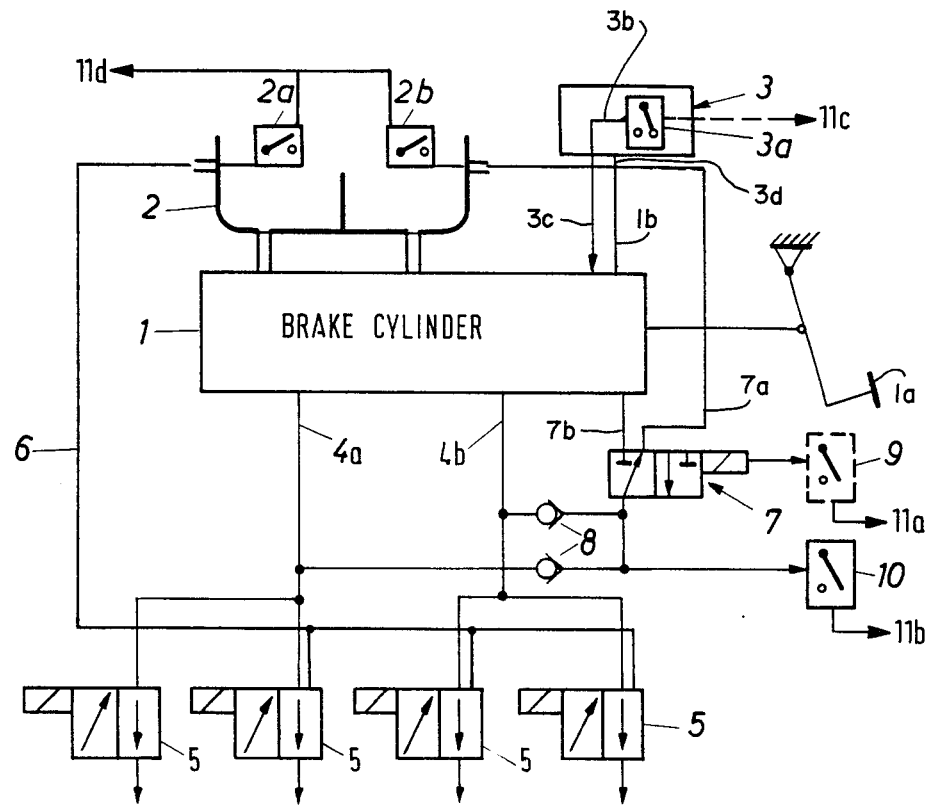
FIG. 1 is an illustration of the fundamental layout of a brake system according to the invention.

In FIG. 1, a brake force amplifier 1, or static brake circuit including a main brake cylinder and piston is shown schematically which may for instance be designed like the prior art brake force amplifier of DE-OS 3 040 548 or 3 040 561. This brake force amplifier 1 can be suitably operated by a foot pedal 1a, as shown and is associated with a divided supply container 2 having two fill level indicators 2a and 2b and also with a pressure supply 3, which has a pressure switch 3a which beyond a predetermined pressure value emits a switching signal. The pressure maintaining means 3a measures the pressure of source 3 which is made available to main brake cylinder 1 via the pressure line 3c shown with the downward extending arrow. The source 3 is connected to the line 3c via a line 3b which connects with the pressure switch 3a. From the main brake cylinder 1, return flow lines 1b and 1c lead to the supply container 2, through which the pressure medium flows back again when the brake pedal 1a is released. The pressure source 3 obtains its supply from the supply container 2 via the return line 1c and a supply line 3d connected to the return line 3c. The two outlets 4a and 4b of the main brake cylinder of the brake force amplifier are connected with anti-skid or "anti-wheel-lock" regulating valves 5, here embodied as 3/2-way valves, the outlets of which are connected with separate wheel brake cylinders, not shown. In the second position, the valves 5 connect the wheel brake cylinders with a return-flow line 6. In the illustrated exemplary embodiment, the pressure supply 3 communicates via the brake force amplifier 1 with a feed valve 7, which here is embodied as a 3/2-way valve and in the illustrated position, a first position, connects its outlet with the supply container 2 via return lines 7a and 1c which connects with return line 1b that returns fluid to the supply container from the brake force amplifier 1, but in its second position connects the pressure supply 3 via line 7b from brake force amplifier 1, then through check valves 8 with the anti-locking valves 5. In the illustrated exemplary embodiment, a switch 9 which functions as a monitoring device is assigned to the feed valve 7, and upon the switchover of the valve 7 this switch 9 emits a signal the function of which will be discussed below. Instead of this position switch 9, it is also possible to use a pressure switch 10, which emits a signal whenever a pressure of predetermined level has been exceeded.

Figure 2:
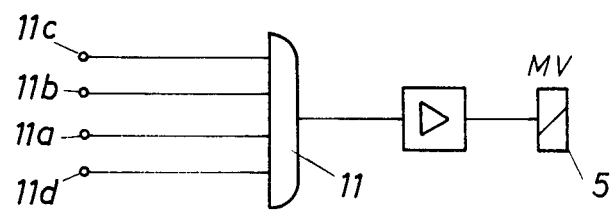
FIG. 2 is an illustration of the trigger circuit for the brake control valves.

The switchover of the feed valve 7 into its second position is effected as soon as regulation has been initiated at at least one wheel. Regulation is necessary when one or more wheels has a danger of locking or skidding. Locking or skidding is determined by use of a well known wheel rotational sensor, not shown, one at each wheel, such sensors have been set forth in U.S. Pat. No. 4,155,604. The wheel sensor sends an electrical signal to the feed valve 7 which switches the feed valve to the second position. When the feed valve 7 moves to the second position the switch 9 is closed which emits a signal which controls the anti-skid valve of the affected wheel(s). The triggering of the individual anti-skid valves 5 is effected as shown in FIG. 2, via respective AND gates 11, to which the signal for the triggering of the valve 5 is delivered at the terminal 11a via the signal of the position switch 9 or of the pressure switch 10 is delivered at the terminal 11b. The switchover of the feed valve 7 is effected as soon as one of the wheel rotation sensors furnishes signals which are typical for a danger of a wheel locking or skidding.

The mode of operation is as follows: During a normal braking event, the brakes are exposed to pressure from the main brake cylinders via the lines 4a and 4b. If regulation of the brake pressure is necessary, then the feed valve 7 is switched into its second position. With this switchover, the position transducer 9 (or the pressure switch 10) emits a signal, and the corresponding valve 5 is triggered via the AND gate 11 via the terminal 11a (or 11b). If the feed valve 7 had not switched over at the onset of regulation, however, then when regulation is performed the pressure medium of the individual brake circuits would be used until exhausted, and the result would be brake failure. But by using the position transducer 9 (or pressure switch 10), regulation is prevented in the event of nonresponse of the valve 7, since the position transducer 9 blocks the AND gate 11. It is thereby assured that the function of normal braking will be retained.

The pressure switch 3a may be connected to terminal 11c, so that even in the event that the pressure supply 3 fails the gate 11 will be blocked. The gate 11 can additionally be blocked via terminal 11d, if it is connected to the switches 2a and 2b and if the pressure medium in the reservoir 2 for the corresponding brake circuit drops below a predetermined level and one of the level-indicating switches 2a or 2b therefore emits a signal.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A hydraulic vehicle brake system including a pressure source, at least one static brake circuit having a main brake cylinder, a piston actuated by a brake pedal, at least one brake pressure anti-skid control valve between said main brake cylinder and at least one wheel brake cylinder responsive to wheel locking for initiating pressure regulation, a return-flow line into a supply container for the pressure medium discharged by said at least one brake pressure anti-skid control valve, an external energy supply system, and a valve assembly responsive to regulation of the brake pressure effecting a switchover position for connecting said external energy supply system to said at least one brake pressure anti-skid control valve, the improvement comprising
 a monitoring device responsive to actuation of said valve assembly for generating a signal when said valve assembly effects said switchover position, and
 a blocking circuit included in a triggering means for said at least one brake pressure anti-skid control valve, said blocking circuit being connected with said monitoring device, whereby upon a tendency to skidding by at least one wheel, said blocking circuit, via said triggering means directs a signal to an associated brake pressure anti-skid control valve which actuates
 said at least one brake pressure control valve into a brake pressure decreasing position for pressure reduction only whenever said monitoring device indicates that said valve assembly has switched over into a second switching position, via which said at least one brake pressure anti-skid control valve is supplied with pressure mediums from said pressure source.

2. A hydraulic vehicle brake system as defined by claim 1, wherein said monitoring device comprises a pressure switch, responsive to a predetermined pressure for generating said signal, and at least one check valve for allowing the delivery of the pressure medium from said valve assembly to said at least one brake pressure control valve incorporated between a connection point of said pressure switch and said at least one brake pressure control valve.

3. A hydraulic vehicle brake system as defined by claim 1, wherein said monitoring device comprises a position switch.

4. A hydraulic vehicle brake system as defined by claim 1, wherein said valve assembly is a 3/2-way valve, which in the initial position connects its outlet with said supply container.

5. A hydraulic vehicle brake system as defined by claim 2, wherein said valve assembly is a 3/2-way valve, which in the initial position connects its outlet with said supply container.

6. A hydraulic vehicle brake system as defined by claim 3, wherein said valve assembly is a 3/2-way valve, which in the initial position connects its outlet with said supply container.

7. A hydraulic vehicle brake system as defined by claim 1, wherein said blocking circuit is additionally connected to a fill level indicator means of said supply container, whereby said blocking circuit is operative when the fill level of said supply container drops below a predetermined value.

8. A hydraulic vehicle brake system as defined by claim 2, wherein said blocking circuit is additionally connected to a fill level indicator means of said supply container, whereby said blocking circuit is operative when the fill level of said supply container drops below a predetermined value.

9. A hydraulic vehicle brake system as defined by claim 3, wherein said blocking circuit is additionally connected to a fill level indicator means of said supply container, whereby said blocking circuit is operative when the fill level of said supply container drops below a predetermined value.

10. A hydraulic vehicle brake system as defined by claim 4, wherein said blocking circuit is additionally connected to a fill level indicator means of said supply container, whereby said blocking circuit is operative when the fill level of said supply container drops below a predetermined value.

11. A hydraulic vehicle brake system as defined by claim 1, wherein said external power supply system comprises a pressure switch connected with said blocking circuit, whereby said blocking circuit is operative in the event of insufficient pressure generation.

12. A hydraulic vehicle brake system as defined by claim 2, wherein said external power supply system comprises a pressure switch connected with said blocking circuit, whereby said blocking circuit is operative in the event of insufficient pressure generation.

13. A hydraulic vehicle brake system as defined by claim 3, wherein said external power supply system comprises a pressure switch connected with said blocking circuit, whereby said blocking circuit is operative in the event of insufficient pressure generation.

14. A hydraulic vehicle brake system as defined by claim 4, wherein said external power supply system comprises a pressure switch connected with said blocking circuit, whereby said blocking circuit is operative in the event of insufficient pressure generation.

15. A hydraulic vehicle brake system as defined by claim 7, wherein said external power supply system comprises a pressure switch connected with said blocking circuit, whereby said blocking circuit is operative in the event of insufficient pressure generation.

* * * * *